United States Patent
Rao et al.

(10) Patent No.: US 6,687,412 B1
(45) Date of Patent: Feb. 3, 2004

(54) METHOD AND SYSTEM FOR GENERATING IMAGE COMPRESSION QUANTIZATION MATRICES

(75) Inventors: Kashipati G. Rao, Dallas, TX (US); Nengtan Lin, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 485 days.

(21) Appl. No.: 09/668,765

(22) Filed: Sep. 22, 2000

(Under 37 CFR 1.47)

Related U.S. Application Data

(60) Provisional application No. 60/160,912, filed on Oct. 22, 1999.

(51) Int. Cl.[7] .............................. G06K 9/36; G06K 9/38; G06K 9/40
(52) U.S. Cl. ....................... 382/251; 382/250
(58) Field of Search .................. 382/250, 251, 382/239; 348/403.1, 404.1, 405.1; 375/240.03, 240.2

(56) References Cited

U.S. PATENT DOCUMENTS

| | | | |
|---|---|---|---|
| 4,780,761 A | * 10/1988 | Daly et al. | ............... 375/240.2 |
| 5,426,512 A | * 6/1995 | Watson | ........................ 382/250 |
| 6,115,423 A | * 9/2000 | Shen et al. | ............ 375/240.03 |

* cited by examiner

*Primary Examiner*—Phuoc Tran
(74) *Attorney, Agent, or Firm*—W. James Brady, III; Frederick J. Telecky, Jr.

(57) ABSTRACT

A system (100) for generating image compression matrices is disclosed. The present invention includes an image (102) having pixel block arrays (104). The present invention also includes a transformer (106) that performs discrete cosine transforms on the pixel block arrays (104) to generate a discrete cosine transform array (107). The present invention also includes a quantizer (108) that receives the discrete cosine transform array (107) and retrieves a quantization coefficient matrix (110) and a model metric (112). Quantizer (108) partitions the quantization coefficient matrix (110) with the model metric (112) to generate a quantization matrix (115). Quantizer (108) also quantizes discrete cosine transform array (107) with the quantization matrix (115) to create a quantized array (117). The present invention also includes an encoder (120) that compresses the quantized array (117).

7 Claims, 1 Drawing Sheet

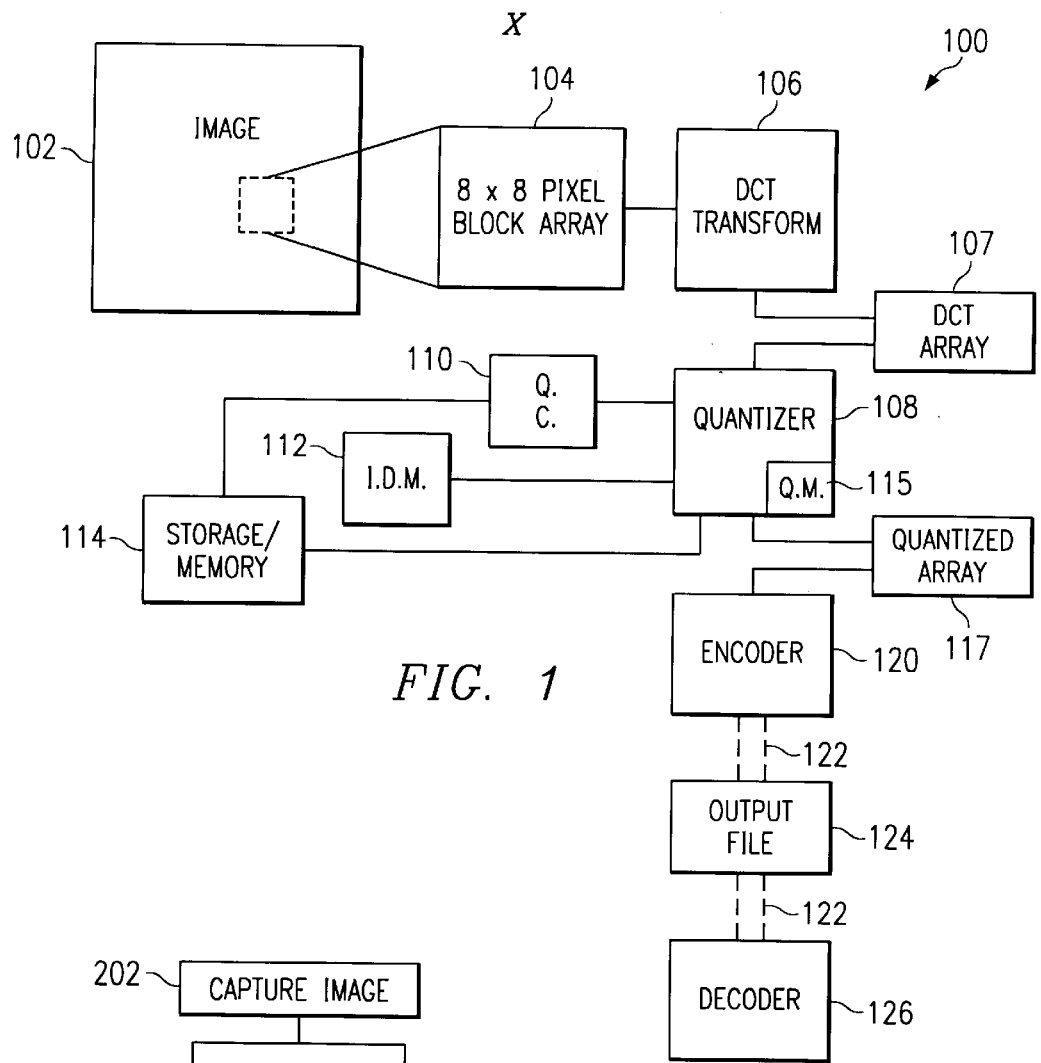
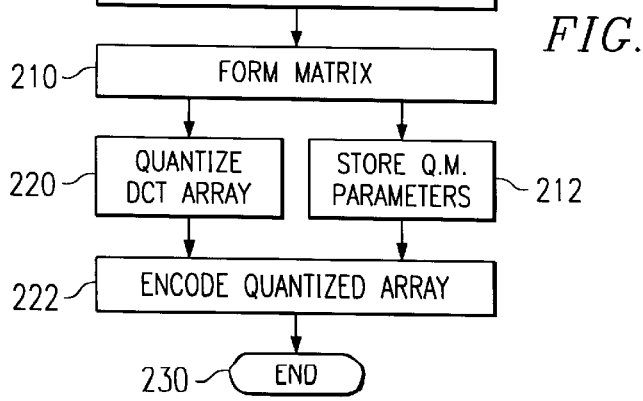

METHOD AND SYSTEM FOR GENERATING IMAGE COMPRESSION QUANTIZATION MATRICES

This application claims priority under 35 USC §119(e)(1) of Provisional Application No. 60/160,912, filed Oct. 22, 1999.

TECHNICAL FIELD OF THE INVENTION

The present invention relates to image compression systems, and, more particularly, to methods and systems for quantizing coefficients of an image.

BACKGROUND OF THE INVENTION

The field of data compression seeks to develop improved methods of compression. A variety of compression methods exist. In general, a compressor, or encoder, compresses raw data in an input stream and creates an output stream having compressed data. A decompressor, or decoder, converts the compressed data back to its original form. Certain compression methods are lossy. These methods, used for image compression, achieve better compression by losing some information from the input stream. When the compressed stream is decompressed, the converted result is not identical to the original data stream. If the loss of data is small, the perceptual difference of a compressed image is negligible.

Graphical images are present in many computer, internet and communication applications, but the image data size tends to be large. The image exists for human perception. When the image is compressed, however, it is not uncommon to lose image features for which the human eye is not sensitive. Thus, the eye cannot see any image degradation.

Because human visual perception is sensitive to some frequencies but not to others, known image compression methods want to remove those frequencies that are less sensitive to human visual perception. The discrete cosine transform ("DCT") is a widely used transform operation in image compression. DCT is the preferred transform for lossy image compression methods. A 2-dimensional DCT is applied to 8 by 8 block arrays of pixels in an image. The transformed coefficients generated by the DCT operation are quantized to provide the actual compression. Most DCT coefficients are small and become zero after quantization.

Human visual perception is less sensitive to the high frequency components of an image represented by the higher DCT coefficients. After each 8×8 block array of DCT coefficients is calculated, it is quantized. This is the step wherein information loss occurs. Each number in the DCT coefficients' matrix is divided by the corresponding number from a particular quantization matrix. The quantized result is rounded to the nearest integer. A large quantization factor usually is applied to higher frequency components within the DCT coefficients' matrix. Thus, a known quantization matrix has higher quantization factors for higher frequency DCT coefficients.

There is trade-off between image quality and the degree of quantization. A large quantization step size may produce unacceptably large image distortion. Finer quantization, however, leads to lower compression ratios. Thus, known image compression methods seek to quantize DCT coefficients in an efficient manner to provide a compressed image with little image distortion perceptive to the human eye. Because of the human eyesight's natural high frequency roll-off, high frequencies play a less important role in known image compression methods than low frequencies.

A quantization matrix is an 8×8 matrix of step sizes, sometimes called quantums, one element for each DCT coefficient. A quantization matrix usually is symmetric. Step sizes may be small in the upper left corner of the matrix, which correlates to low frequencies. Step sizes may be large in the lower right corner of the matrix, which represents high frequencies. A step size of 1 is the most precise. A quantizer divides the DCT coefficient by its corresponding quantum, then rounds to the nearest integer. Large quantums drive small coefficients down to zero. This results in many high frequency coefficients becoming zero, and, therefore, an image is easier code. The low frequency coefficients undergo only minor adjustments. Many zeros among the high frequency coefficients result in an efficient compression. Thus, known image compression methods may use a higher quantum for the high frequency coefficients with little noticeable image deterioration.

Quantization matrices, or tables, may be generated by default or computed. Further, it may be desirable to quantize the DCT coefficients by some metric that optimizes image compression by losing coefficients not sensitive to the human visual system. Known methods compare previous image coefficients with an instant image coefficient to locate similar blocks and to find a best match. Differences between the previous image and the instant image are determined and then transformed into DCT coefficients. Other known methods use tiling or flipping of the DCT coefficients in order to generate larger size DCT coefficient images. Other known methods perform a preliminary investigation of the actual response of the human visual system to different DCT coefficients to determine a model metric the quantization matrix partitioning.

Human visual systems, however, are not sensitive to particular frequencies or spatial differences within all images. In other words, a human visual system may be less sensitive to a particular DCT coefficient in one context and more sensitive in another context. These human visual system metrics may not apply in all instances of image compression. Thus, different quantization matrices may be desired to compress a plurality of images. Current methods of image compression are time-consuming and inefficient for determining and optimizing quantization matrices.

SUMMARY OF THE INVENTION

From the foregoing, it may be appreciated that a need had arisen for a system and method for generating image compression quantization matrices within an image compression system. In accordance with one embodiment of the present invention, a system and method for generating image compression quantization matrices is provided that substantially eliminates and reduces the disadvantages and problems associated with conventional image compression systems.

In accordance with one embodiment of the present invention, a method for generating quantization matrices is provided. The method includes the step of retrieving a model metric. The method also includes the step of determining a quantization coefficient matrix. The method also includes partitioning the quantization coefficient matrix with the model metric to generate a quantization matrix.

In accordance with another embodiment of the present invention, a method for compressing an image having pixel blocks is provided. The method includes the step of capturing the image having the blocks. The method also includes the step of transforming the blocks to a discrete cosine transform blocks array. The method also includes retrieving a model metric. The method also includes determining a quantization coefficient matrix. The method also includes partitioning the quantization coefficient matrix with the model metric to generate a quantization matrix. The method also includes quantizing the discrete cosine transform block array with the quantization matrix. The method also includes encoding the quantized transforms.

In accordance with another embodiment of the present invention, a system for generating image compression quantization matrices is provided. The compression system includes an image comprised of pixel blocks. The system also includes a discrete cosine transform array comprised of the discrete cosine transforms of the pixel blocks. This system includes a quantization coefficient matrix. This system also includes an image distortion model metric. This system also includes a quantizer that partitions the quantization coefficient matrix with the model metric and generates a quantization matrix. The quantizer also quantizes the discrete cosine transform array with the quantization matrix. The system also includes an encoder that encodes the quantized transforms. The system may include a decoder that decodes a received signal from the encoder and uncompresses the quantized transformed array.

Thus, the present invention obtains phase-reliable discrete cosine transform basis functions and uses them to partition a quantization matrix using channel image distortion matrix. The coefficients in the quantization coefficient matrix correlate to frequency bands in orientations in the channel image distortion metric. The partition is then used for vision optimized encoding.

The channel image distortion model metric produces image distortion metric values for vertical and horizontal orientations. For each orientation, image distortion metric values are generated for three frequency bands: low, mid, and high.

A technical advantage of the present invention is that it treats the function of transforming an image for encoding as a continuous function. Thus, video as well as still, images may be compressed. Another technical advantage of the present invention is that expansion to a larger image is optimized both conceptually and in implementation. Another technical advantage of the present invention is that the compression system does not rely on a human visual system. Another technical advantage of the present invention is that the compression procedure is automated by using the image distortion model metric followed by a partitioning step. Another technical advantage of the present invention is that the compression and encoding of an image has increased reliability and consistency.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates an image compression system in accordance with an embodiment of the present invention.

FIG. 2 illustrates a flowchart depicting a method for generating image compression quantization matrices in accordance with an embodiment of the present invention.

DETAILED DESCRIPTION OF THE DRAWING

An embodiment of the present invention and its advantages are best understood by referring now in more detail to FIGS. 1–2 of the drawings, in which like numerals refer to like parts. FIGS. 1–2 illustrate a system and method for generating image compression quantization matrices in accordance with one embodiment of the present invention.

FIG. 1 depicts an image compression system 100. Within image compression system 100, an image 102 is retrieved or captured. Image 102 is a graphical image in 2-dimensions. Image 102 includes a horizontal orientation and a vertical orientation. Image 102 may be a picture, graphic, or the like. In a preferred embodiment, image 102 is a natural image or scene. Image 102 is comprised of pixels. The pixels of image 102 may vary by color, contrast, luminance, intensity and gray scale level. Pixel block array 104 is a block of pixels within image 102. In a preferred embodiment, pixel block array 104 has an 8×8 dimension. Image 102 comprises a plurality of pixel block arrays 104 that are captured by image compression system 100.

Transformer 106 calculates the discrete cosine transform ("DCT") of each pixel block within pixel block array 104. As described above, the DCT coefficients calculated by transformer 106 represent the transform of a signal or image from the spatial domain to the frequency domain. DCT operations help separate pixel block array 104 into parts, or spectral sub-bands, of differing importance with respect to the visual quality of the pixel blocks within pixel block array 104. Thus, transformer 106 generates a DCT coefficient array 107 correlating to the pixel blocks within pixel-block array 104.

DCT array 107 has high and low frequency values. As described above, high frequency DCT values may not be perceived by the human visual system. DCT array 107 has low frequency values in the upper left hand corner of DCT array 107. High frequency DCT values are in the lower right hand corner of DCT array 107.

Quantizer 108 receives DCT array 107, as well as quantization coefficient matrix 110 and image distortion model metric 112. Quantization coefficient matrix 110 may be a default coefficient matrix using known JPEG or MPEG parameters. Quantization coefficient matrix 110 comprises values, or quantums, correlate to the values in DCT array 107. Quantization coefficient matrix 110 also may be a default quantization table. A default quantization table may comprise luminance or gray-scale components. Quantization coefficient matrix 110 may be fine-tuned by a user. Quantization coefficient matrix 110 also may be computed based on a parameter supplied by a user of compression system 100. The parameter insures that the coefficients within quantization coefficient matrix 110 are small at the upper left corner and increased toward the bottom right corner of the matrix.

Image distortion model metric ("IDM") 112 also is inputted into quantizer 108. IDM 112 is a model of a human visual system generated in a known manner. IDM 112 is comprised of values that correlate to spatial frequency combinations sensitive to the human visual system. IDM 112 comprises a matrix with values for vertical and horizontal orientations. For each orientation, IDM 112 has values for three frequency bands. The three frequency bands are low, mid, and high. IDM 112 provides output in just-noticeable-difference ("JND") levels. JND provides a reliable indication of the perceived image quality and corresponds to perfect image quality at the lowest possible bit rate. IDM 112 may be generated by performing tests on human visual systems regarding perception of colors, gray-scales or the like. Using these tests, IDM 112 is created.

Quantization coefficient matrix 110 may be stored in memory 114. Thus, when quantizer 108 receives DCT array 107 from transformer 106, quantizer 108 retrieves quantization coefficient matrix 110 from memory 114. Quantizer 108 also retrieves IDM 112. IDM 112 also may be stored in memory 114. Alternatively, IDM 112 may be supplied by the user via a disk, algorithm, or other means.

Quantizer 108 partitions quantization coefficient matrix 110 with IDM 112 to generate a quantization matrix 115. By partitioning with IDM 112, quantization matrix 115 has increased sensitivity to the human visual system. Thus, quantization coefficient matrix 110 is refined to provide a better and optimal quantization matrix 115 to quantize DCT array 107.

In an embodiment, DCT array 107 from transformer 106 is quantized by quantization matrix 115. Information loss occurs during this process. Each number in the DCT array 107 is divided by the corresponding factor, or quantum, from quantization matrix 115. The result is rounded to the nearest integer. Quantizer 108 produces a quantized array 117 comprised of the integers formulated during quantization. Typically, quantized array 117 has very few non-zero values in the upper left corner of the array, or matrix and zero values in the lower right corner.

Quantized array 117 is input to encoder 120 to be further compressed before being written onto output stream 122. Quantized array 117 has a DC coefficient that is a measure of the average value of the 64 original pixels comprising the data array. The DC coefficient is located at the top left corner of quantized array 117. A continuous tone image does not have noticeable variation within array 117 from the DC coefficient. Encoder 120 outputs the DC coefficient first, then follows with the differences in consecutive data units. Thus, image 102 is compressed after transformation and quantization by encoder 120. Encoder 116 uses a variable length code on the coefficients within quantized array 117 and compressed data output stream 122 to output file 124. For decompression, decoder 118 recovers the quantized DCT coefficients from the compressed data output stream 122 within an output file 117, takes the inverse transforms of the coefficients and displays image 102.

FIG. 2 depicts a flow chart of a method for generating quantitization matrices and compressing image 102 in accordance with another embodiment of the present invention. Step 202 captures image 102. Step 202 may capture image 102 from a video recording device, a still image, a downloaded image from the internet, a still image from a digital camera, or the like. Step 204 executes by performing discrete cosine transform operations on pixel block array 104 within image 102. As described above, DCT array 107 is computed that corresponds to the spatial-frequency transform of pixel block array 104. Step 206 executes by compression system 100 retrieving IDM 112.

Step 208 executes by quantizer 108 inputting quantization coefficient matrix 110 and IDM 112. Step 208 also executes by partitioning the quantization coefficient matrix 110 to generate the compression, or quantization, parameters for quantization matrix 115. Step 210 executes by forming quantization matrix 115 having coefficients that have been partitioned by IDM 112. Step 212 executes by storing quantization matrix 115 parameters within memory 114.

Step 220 executes by quantizing the DCT array 107 generated in step 204 by quantization matrix 115 generated in step 210 to generate quantized array 117. Step 220 also executes by losing those quantized values that have been reduced to zero during the quantization process. Step 220 executes by encoding the quantized array 117 with encoder 120. As described above, encoder 120 encodes the quantized array 117 by outputting the DC coefficient followed by the AC coefficients of array 117. Step 230 executes by quitting the quantization process within compression system 100.

Thus, it is apparent that there has been provided, in accordance with one of the embodiments of the present invention, a system and method for generating image compression matrices that satisfies the advantages set forth above. Although the present has been described in detail, it should be understood that various changes, substitutions, and alterations may be made herein. Other examples are readily ascertainable by one skilled in the art and may be made without departing from the spirit and the scope of the present invention as defined by the following claims.

What is claimed is:

1. A method for generating quantization matrices to encode a discrete cosine transform array of an image, the method comprising:

retrieving a model metric that comprises a matrix with values for vertical and horizontal orientations and for each orientation has values for low, mid and high frequency bands;

determining a quantization coefficient matrix; and grouping said quantization coefficient matrix with said model metric to generate a quantization matrix.

2. The method of claim 1, further comprising the step of:

saving said quantization matrix to a memory.

3. The method of claim 1, further comprising the step of:

capturing said image and generating said discrete cosine transform array from blocks in said image.

4. The method of claim 3, further comprising the step of:

quantizing said discrete cosine transform array with said quantization matrix.

5. The method of claim 4, further comprising the step of:

encoding said quantization matrix.

6. The method for compressing an image having v blocks, the method comprising:

capturing said image having blocks;

transforming said blocks to a discrete cosine transform array;

retrieving a model metric that is comprised of values that correlate to spatial frequency combinations sensitive to the human visual system; said model metric comprises a matrix with values for vertical and horizontal orientations and for each orientation has values for low, mid and high frequency bands in just-noticeable-difference levels;

determining a quantization coefficient matrix;

grouping said quantization coefficient matrix with said model metric to generate a quantization matrix;

quantizing said discrete cosine transform array with said quantization matrix to create a quantized transform array; and encoding said quantized transform array.

7. An image compression system for generating quantization matrices, comprising:

a quantization coefficient matrix and a model metric; said model metric is comprised of values that correlate to spatial frequency combinations sensitive to the human visual system; said model metric comprises a matrix with values for vertical and horizontal orientations and for each orientation has values for low mid and high frequency bands in just-noticeable-difference levels;

a quantizer that groups said quantization coefficient matrix with said model metric to generate a quantization matrix.

* * * * *